US012713311B2

(12) United States Patent
Umair et al.

(10) Patent No.: US 12,713,311 B2
(45) Date of Patent: Aug. 18, 2026

(54) METHOD AND APPARATUS FOR RAN SLICE CELL FOR SERVICE CONTINUITY

(71) Applicant: Samsung Electronics Co., Ltd., Suwon-si (KR)

(72) Inventors: Mohammad Umair, Bangalore (IN); Nishant, Bangalore (IN); Nitesh Pushpak Shah, Bangalore (IN); Kailash Kumar Jha, Bangalore (IN); Amit Anandrao DAnge, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 18/598,550

(22) Filed: Mar. 7, 2024

(65) Prior Publication Data

US 2024/0314653 A1 Sep. 19, 2024

(30) Foreign Application Priority Data

Mar. 15, 2023 (IN) ............................ 202341017581

(51) Int. Cl.
*H04W 36/00* (2009.01)
*H04W 48/08* (2009.01)

(52) U.S. Cl.
CPC ..... *H04W 36/00835* (2018.08); *H04W 48/08* (2013.01)

(58) Field of Classification Search
CPC ........... H04W 36/00835; H04W 48/08; H04W 48/12
See application file for complete search history.

(56) References Cited

U.S. PATENT DOCUMENTS

| | | | | |
|---|---|---|---|---|
| 12,262,314 | B2 * | 3/2025 | Venkataraman .. | H04W 72/0453 |
| 2021/0274428 | A1 * | 9/2021 | Futaki .................. | H04W 48/08 |
| 2022/0303871 | A1 * | 9/2022 | Chen ..................... | H04W 48/02 |
| 2022/0377659 | A1 * | 11/2022 | Venkataraman ...... | H04W 48/12 |
| 2024/0015798 | A1 * | 1/2024 | Cheng ............... | H04W 74/0833 |
| 2024/0314653 | A1 * | 9/2024 | Umair ............ | H04W 36/00835 |

* cited by examiner

*Primary Examiner* — Md K Talukder
(74) *Attorney, Agent, or Firm* — Nixon & Vanderhye P.C.

(57) ABSTRACT

The disclosure relates to a 5G or 6G communication system for supporting a higher data transmission rate. A method performed by a user equipment (UE) in a wireless communication system is provided. The method comprises receiving, from a base station, a system information block (SIB) including slice information, identifying at least one cell for a slice service for the UE among a plurality of neighboring cells based on the slice information and camping on the at least one cell for the slice service.

12 Claims, 11 Drawing Sheets

METHOD AND APPARATUS FOR RAN SLICE CELL FOR SERVICE CONTINUITY

CROSS-REFERENCE TO RELATED APPLICATION

This application is based on and claims priority under 35 U.S.C. § 119 to Indian Patent application Ser. No. 202341017581, filed on Mar. 15, 2023, in the Indian Patent Office, the disclosure of which is incorporated by reference herein in its entirety.

BACKGROUND

1. Field

The disclosure relates to wireless communication networks, and for example, to prioritization of radio access network (RAN) Slice Cells.

2. Description of Related Art

5th generation (5G) mobile communication technologies define broad frequency bands such that relatively higher transmission rates and new services are possible, and can be implemented in "sub 6 GHz" bands such as 3.5 GHz, as well as in "above 6 GHz" bands, which may be referred to as mmWave, including 28 GHz and 39 GHz. In addition, it has been considered to implement 6th generation (6G) mobile communication technologies (e.g., beyond 5G systems) in terahertz (THz) bands (e.g., 95 GHz to 3 THz bands) in order to accomplish transmission rates fifty times faster than 5G mobile communication technologies and ultra-low latencies one-tenth of 5G mobile communication technologies.

Since the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi-input multi-output (MIMO) for mitigating radio-wave path loss and increasing radio-wave transmission distances in mmWave, supporting numerologies (e.g., operating multiple subcarrier spacings) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for larger amounts of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by future 5G mobile communication technologies including physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, a non-terrestrial network (NTN), which is UE-satellite direct communication for providing coverage in an area in which communication with terrestrial networks is unavailable, and positioning.

There is also ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR).

There is also ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are commercialized, the number of devices that will be connected to communication networks is expected to exponentially increase, and it is accordingly expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (ME), etc., 5G performance improvement and complexity reduction by utilizing artificial intelligence (AI) and machine learning (ML), AI service support, metaverse service support, and drone communication.

Furthermore, such development of 5G mobile communication systems will serve as a basis for developing new waveforms for providing coverage in THz bands of 6G mobile communication technologies, multi-antenna transmission technologies such as full dimensional MIMO (FD-MIMO), array antennas and large-scale antennas, metamaterial-based lenses and antennas for improving coverage of THz band signals, high-dimensional space multiplexing technology using orbital angular momentum (OAM), and reconfigurable intelligent surface (RIS), as well as full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

SUMMARY

A method performed by a user equipment (UE) in a wireless communication system is provided. The method comprises receiving, from a base station, a system information block (SIB) including slice information, identifying at least one cell for a slice service for the UE among a plurality of neighboring cells based on the slice information and camping on the at least one cell for the slice service.

A user equipment (UE) in a wireless communication system is provided. The UE comprises at least one processor and memory storing instructions that, when executed by the at least one processor, cause the UE to receive, from a base station, a system information block (SIB) including slice information, identify at least one cell for a slice service for the UE among a plurality of neighboring cells based on the slice information, and camp on the at least one cell for the slice service.

BRIEF DESCRIPTION OF THE DRAWINGS

Embodiments herein are illustrated in the accompanying drawings, throughout which like reference letters refer to corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1:
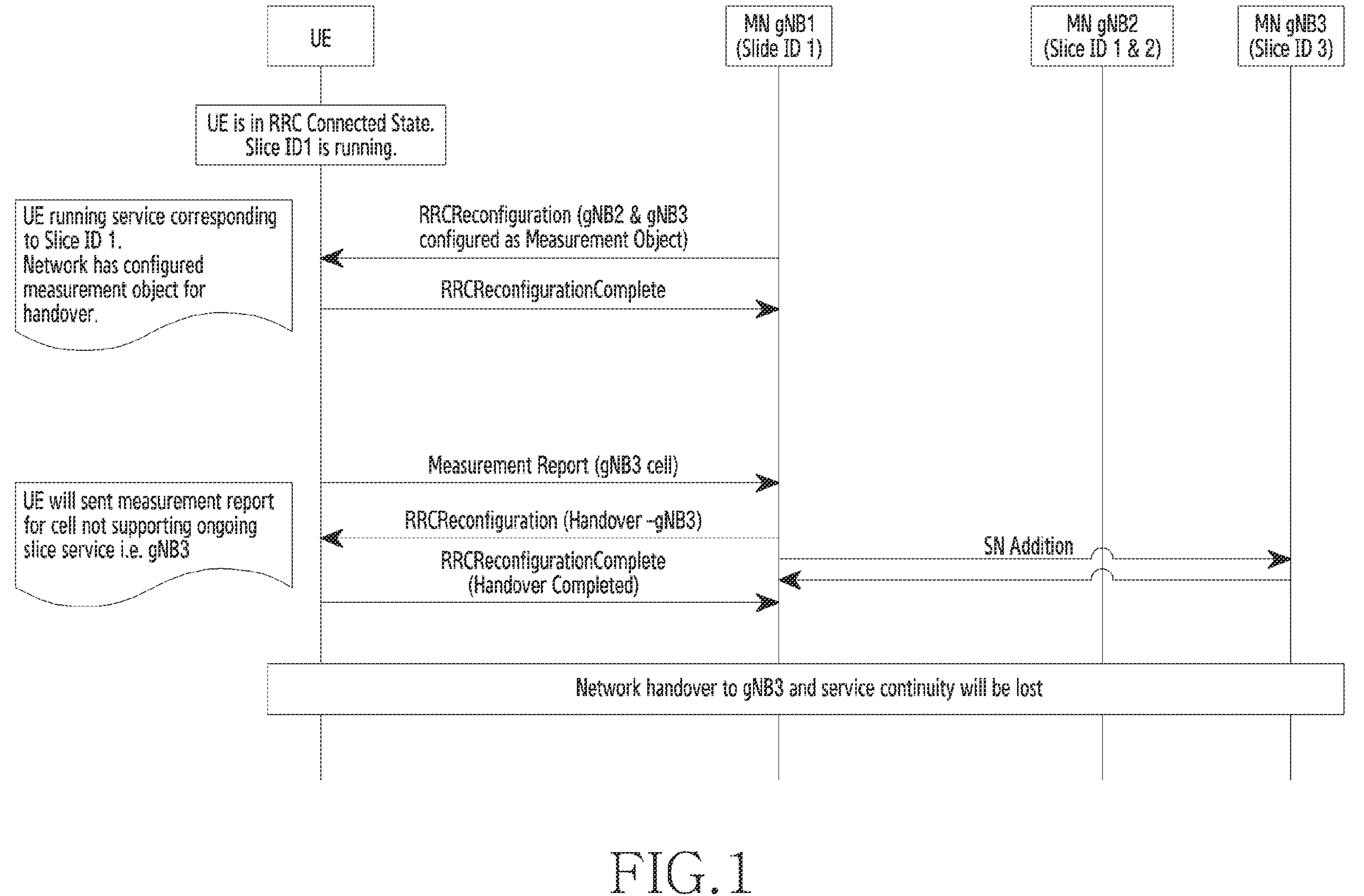
FIG. 1 is a signal flow diagram illustrating an example first challenge scenario relating to non-consideration of RAN slice support by a UE for handover according to various embodiments.

The various example embodiments herein and the various features and advantageous details thereof are explained more fully with reference to the accompanying drawings and detailed in the following description. Descriptions of well-known components and processing techniques may be omitted so as to not unnecessarily obscure the disclosure herein. The examples used herein are intended merely to facilitate an understanding of ways in which the embodiments herein may be practiced and to further enable those of skill in the art to practice the embodiments herein. Accordingly, the examples should not be construed as limiting the scope of the disclosure herein.

The embodiments herein seek to address the drawbacks outlined in the challenge scenarios, wherein the drawbacks are primarily associated with the lack of consideration or prioritization of Network Slices AS Group (NSAG) ID in a neighboring cell. The NSAG ID indicates the RAN slice support in a cell. The embodiments herein address the drawbacks in the challenge scenarios by enabling a UE to consider or prioritize RAN slice support when looking at measurement objects. The System Information Block 16 (SIB 16) of each neighboring cell, and for example, the sliceinfoList-17 information element (IE) of SIB 16, indicates which RAN slice is supported by the neighboring cell. The embodiments herein configure the UE to read the SIB 16 of a neighboring cell to determine if the neighboring cell supports the UE's intended RAN slice, and accordingly, the UE includes information of that neighboring cell supporting the UE's intended RAN slice in the measurement report.

Embodiments disclosed herein allow the UEs to prioritize and secure registration on cells that support the UE's intended RAN slice. The UE would be able to access the intended RAN slice, and thereby maintain service continuity. The embodiments herein are applicable in various scenarios such as, but not limited to, early measurement, handover, redirection, mobility to NR, and MR-DC configuration. Users would be able to get better slice service experience, avoid service discontinuity/interruption, and avoid any delays in receiving slice services as the UE would be able to select a cell that supports the intended slice service. Ultimately, the user's overall experience with 5G would be enhanced.

The disclosure provides various example systems and methods for consideration or prioritization of RAN slice support in a cell.

These and other aspects of the disclosure will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure herein without departing from the spirit thereof, and the embodiments herein include all such modifications.

Fifth generation (5G) networks aim to boost the digital transformation of variety of industry verticals, such as, but not limited to, enhanced mobile broadband (eMBB), ultra-reliable low-latency communication (uRLLC), and massive machine-type communication (mMTC). RAN slicing, which was introduced by the Third Generation Partnership Project (3GPP) in release-17 technical specification, allows partitioning a single physical network into multiple virtual networks, allowing an operator to offer optimal support for different types of services for different types of customer segments.

A network may deploy a RAN slice such that multiple and different slices can be supported on different cells, or multiple and different slices can be supported on the same cell. A User Equipment (UE) may support multiple slice applications which can be run in parallel or one at a time depending on the application usage and/or users' requirements. While registered on the 5G network, any slice service that is triggered by the user can cause the UE to start the slice specific application with the assumption that the current cell supports the slice service that is required. However, if this assumption is incorrect, it can lead to several challenges.

Scenario 1: No Consideration of RAN Slice Cell Service During Handover:

FIG. 1 is a signal flow diagram illustrating an example first challenge scenario relating to non-consideration of RAN slice support by a UE for handover according to various embodiments. In a first scenario (as illustrated in FIG. 1), the UE may be in New Radio (NR) Radio Resource Control (RRC) connected mode and a desired RAN slice specification (corresponding to Slice ID 1 in FIG. 1), may be running on the UE with the help of the current serving cell. There may be various NR frequencies that are configured by the network as measurement objects for measuring the neighboring cell(s) for handover. The UE may measure these NR frequencies to detect the neighboring cells (gNB1 (Next Generation Node B), gNB2, and gNB3 in FIG. 1) and the signal condition of these neighboring cells. On completing this measurement, the UE may send a measurement report to the network with information on those neighboring cells that satisfy a measurement criteria for handover. As shown in FIG. 1, gNB1 supports the UE's desired RAN slice service for the UE, gNB2 supports the UE's desired RAN slice service and an additional RAN slice service, and gNB3 does not support the UE's desired RAN slice service. It can also be seen from FIG. 1 that only gNB3 cell supports the UE's measurement criteria. Since, this measurement report may be based on the signal condition of these neighboring cells, and not whether the neighboring cell supports the RAN slice that is supported by the current serving cell, the target cell (the cell that is selected/prioritized by the UE, e.g., gNB3 in this case) may not support the UE's desired RAN slice service.

So, during handover, the UE may move to a neighboring cell that does not support the RAN slice service that was previously ongoing, which can lead to service discontinuation or degradation. Since the measurement report may never consider in case that the neighboring cell supports the desired RAN slice service, this issue may continue to persist when the UE is in the target cell.

Figure 2:
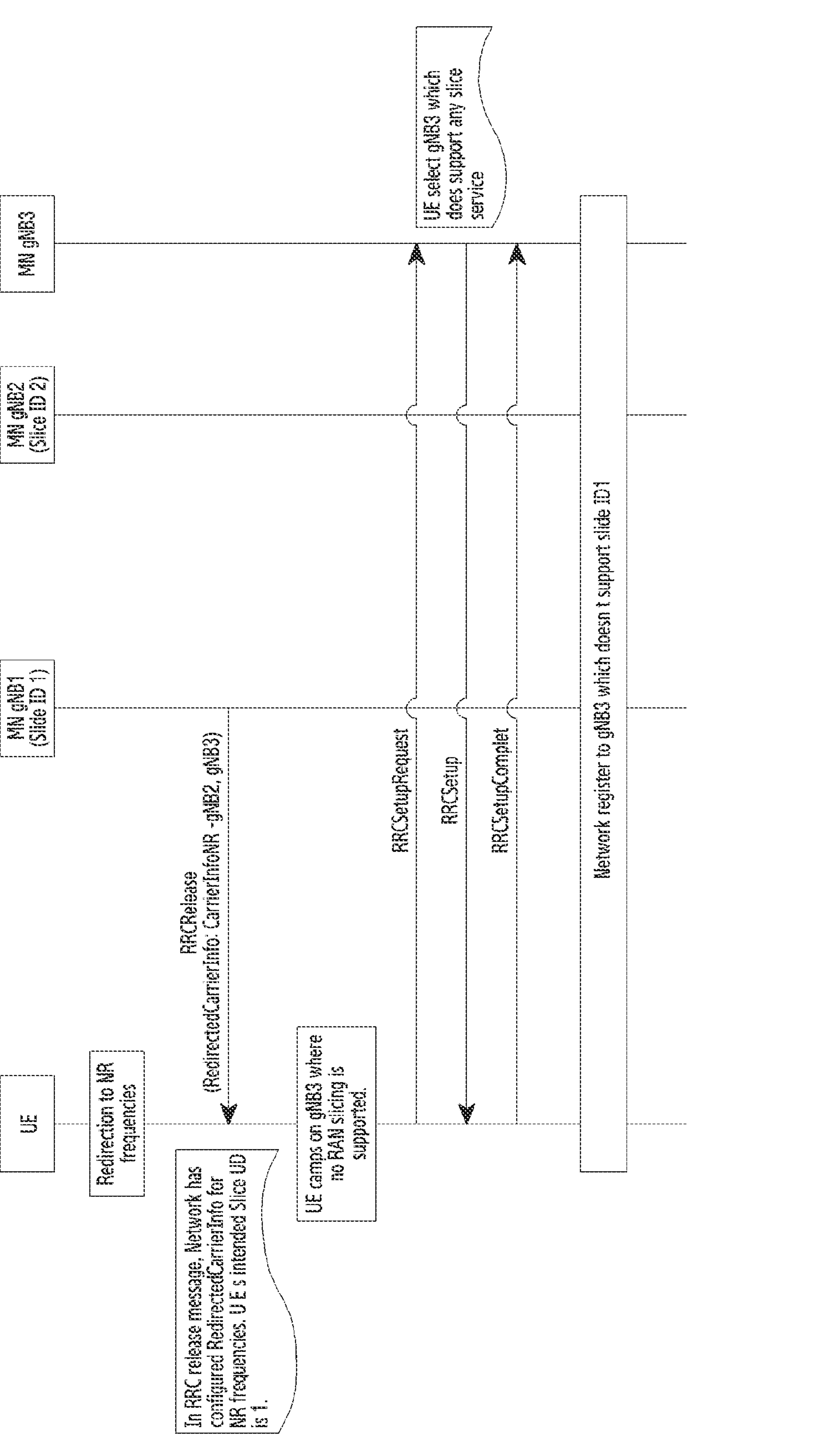
FIG. 2 is a signal flow diagram illustrating an example second challenge scenario relating to non-consideration of RAN slice support by a UE for redirection according to various embodiments.

Scenario 2: No Consideration of RAN Slicing/RAN Slice Support During Redirection:

FIG. 2 is a signal flow diagram illustrating an example second challenge scenario relating to non-consideration of RAN slice support by a UE for redirection according to various embodiments. As illustrated in FIG. 2, during RRC connection release (Radio Access Technology (RAT) for Fourth Generation (4G) or 5G network), the network may provide the UE with redirection information that can help the UE with acquiring a target cell as the network may have knowledge of the topology of the neighboring cell(s), and the redirection information may be based on this knowledge. As shown in FIG. 2, there may be a gNB1 that supports a RAN slice with ID 1, a gNB2 that supports a RAN slice with ID 2, and a gNB3 that does not support any RAN slice.

The redirection information can include RAT details, frequency, or cell information, which may narrow down the neighboring cell search, and therefore, aid the UE to acquire a target cell more efficiently. The network may also provide the UE with different NR redirection frequencies for camping after RRC connection release. The UE may measure these NR redirection frequencies to find a target cell to camp on. However, as the ability of the target cell to support RAN slicing or if the target supports an intended RAN slice is not a consideration by the UE when it chooses a target cell to camp on, it may be the case that (1) the UE will have to perform cell reselection in case that this target cell does not support RAN slicing or the intended RAN slice, or (2) the network may move the UE to a new target cell (which has RAN slice support) through handover after going to connected mode. With respect to FIG. 2, here the UE camps on gNB3 where there is no support for RAN slicing. Since the UE may now have to undergo cell reselection for its intended RAN slice support, there may be a delay in the intended RAN slice service being provided to the user.

Scenario 3: No Consideration of RAN Slice Cell During Mobility Command to NR

There may be situations where the UE may be moving towards NR (5G RAT) from another RAT (like Evolved Universal Terrestrial Radio Access (EUTRA, e.g., 4G RAT)). In such a situation, the network may configure NR frequencies as measurement objects in LTE for inter-RAT (IRAT) measurement for IRAT handover.

The UE may detect NR cells on these configured NR frequencies for measurement reporting, and accordingly, may send measurement reports to the network, wherein these measurement reports include details of those NR cells that satisfy one or more measurement criteria. However, the current measurement criteria does not consider whether these detected NR cells support the UE's intended RAN slice, and therefore, the UE could move to a cell that does not support RAN slicing or the UE's intended slice. After moving to a non-supporting cell, the UE may then have to request for its intended slice service, and then force cell reselection or handover in order to access the requested slice that would offer the intended service.

Figure 3:
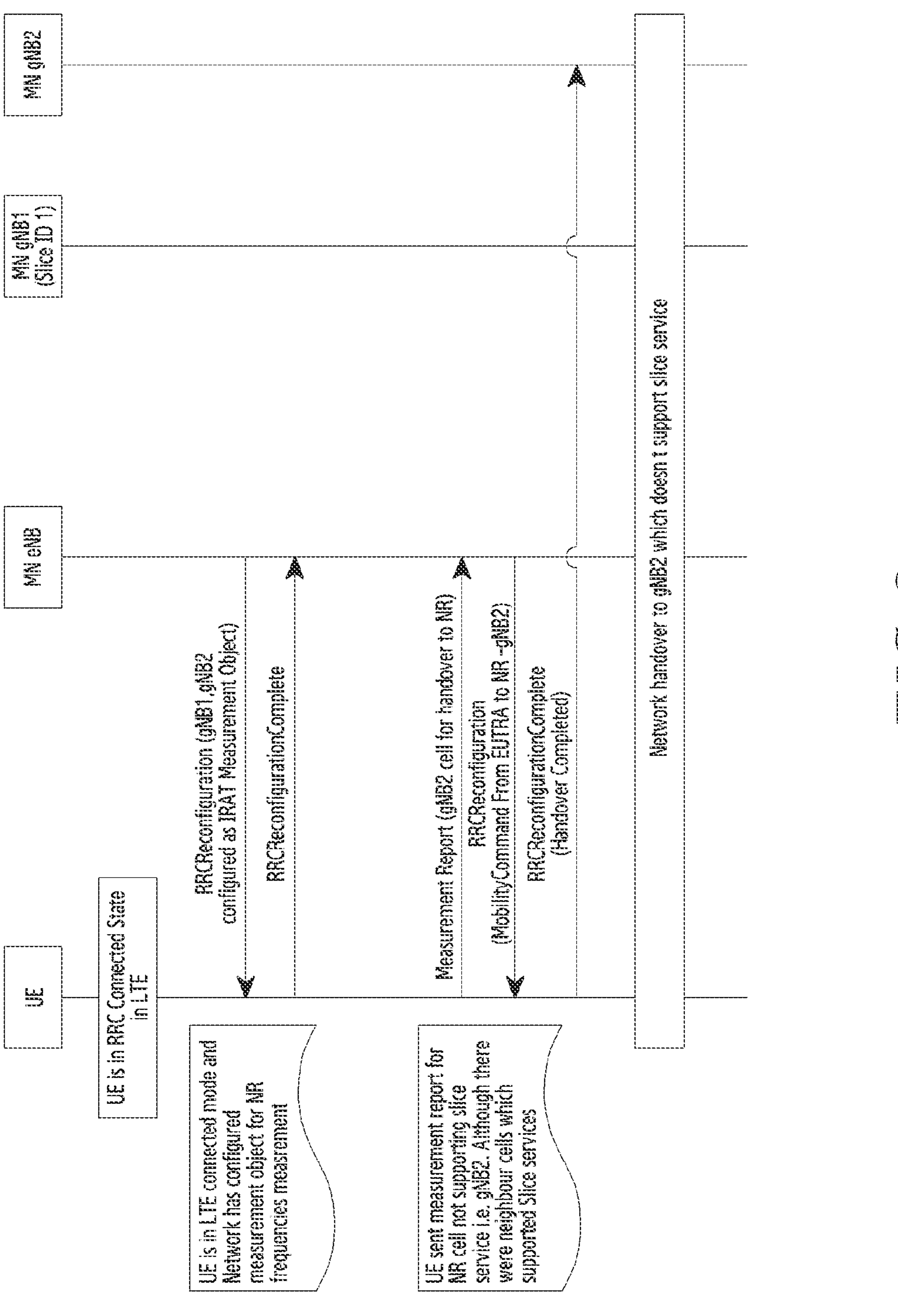
FIG. 3 is a signal flow diagram illustrating an example third challenge scenario relating to non-consideration of RAN slice support when a UE moves from a first RAT to 5G RAT according to various embodiments.

FIG. 3 is a signal flow diagram illustrating an example third challenge scenario relating to non-consideration of RAN slice support when a UE moves from a first RAT to 5G RAT according to various embodiments. This challenge scenario is illustrated in FIG. 3. Referring to FIG. 3, the UE moves from eNB (Evolved Node B) (4G base station) to one of the detected base stations in NR (gNB1 or gNB2) (5G base station). Although, gNB1 supports the intended RAN slice for the UE, the UE does not consider RAN slice support for handover, and as a result, the UE selects gNB2 (which does not support the UE's intended RAN slice) for handover.

Ultimately, this can delay the user's access to the requested slice service when the UE moves from a previous RAT to 5G RAT, leading to an undesirable user experience.

Scenario 4: No Prioritization of RAN Slice Cell Service During Release-16 Early Measurement:

Release-16 (rel-16) early measurement feature ensures early and fast reporting of measurement report from neighboring and serving cells in IDLE/INACTIVE mode (or, idle/inactive state) to reduce delay in setting up Multi-RAT-Dual Connectivity (MR-DC) and/or carrier aggregation (CA).

In IDLE/INACTIVE mode, in case that a slice specific service is triggered by a user, and the requested RAN slice is not supported by the serving cell, then the UE may have to undergo cell reselection to move to a cell that supports the requested RAN slice. Since cell reselection can consume additional time, this can lead to a delay in the user receiving the service associated with the requested RAN slice.

As another example, a UE may look for a secondary cell that may support the requested RAN slice, using the rel-16 early measurement feature. However, the current consideration for the UE when looking for secondary cells is not based on the secondary's cell's ability to support the requested RAN slice, but instead the current consideration for the UE is based on the secondary cell's signal strength. Therefore, even with early measurement reporting available in the serving cell, there is no guarantee that the secondary will support the requested RAN slice. Consequentially, this can lead to delayed service or service discontinuity, which may lead to a poor user experience.

Figure 4:
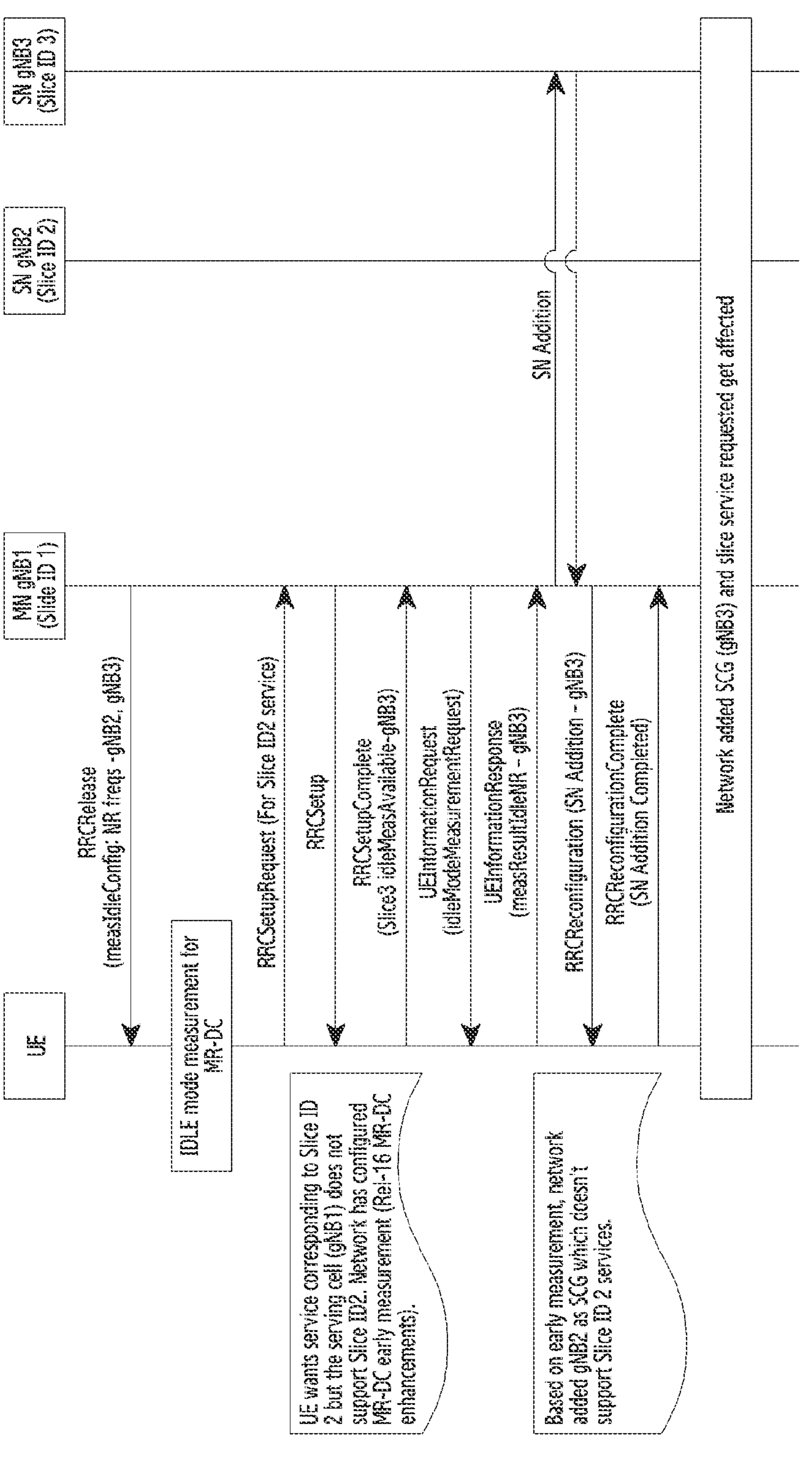
FIG. 4 is a signal flow diagram illustrating an example fourth challenge scenario relating to non-prioritization of RAN slice support during early rel-16 measurement according to various embodiments.

FIG. 4 is a signal flow diagram illustrating an example fourth challenge scenario relating to non-prioritization of RAN slice support during early rel-16 measurement according to various embodiments. FIG. 4 illustrates the scenario 4. Here, the serving cell (gNB1) of the UE supports Slice ID 1, however, the serving cell does not support Slice ID 2, whose services the UE wishes to avail. Since gNB1 does not support the UE's intended RAN slice, the UE may look for a secondary cell that supports the intended RAN slice. In FIG. 4, gNB2 and gNB3 are listed as potential secondary cells, wherein gNB2 supports the intended RAN slice (Slice ID 2), whereas gNB3 supports a different RAN slice (Slice ID 3). Although, in such a situation, the UE is supposed to send information about the gNB2 to the network. Since the gNB2 supports the UE's intended RAN slice, the UE ends up sending information about gNB3 to the network for addition as the secondary cell. The reason for this is that the UE does not consider RAN slice support as a factor when looking for the secondary cell, and ultimately, the network adds a secondary cell that does not offer the intended slice service.

Figure 5:
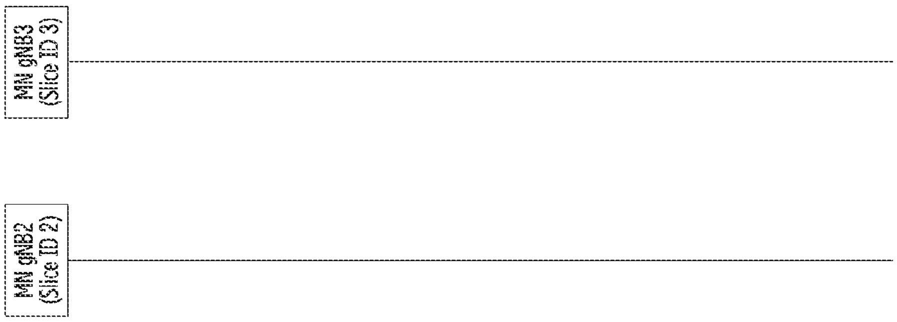
FIG. 5 is a signal flow diagram illustrating an example fifth challenge scenario relating to non-consideration of RAN slice support during MR-DC configuration according to various embodiments.
Figure 5:
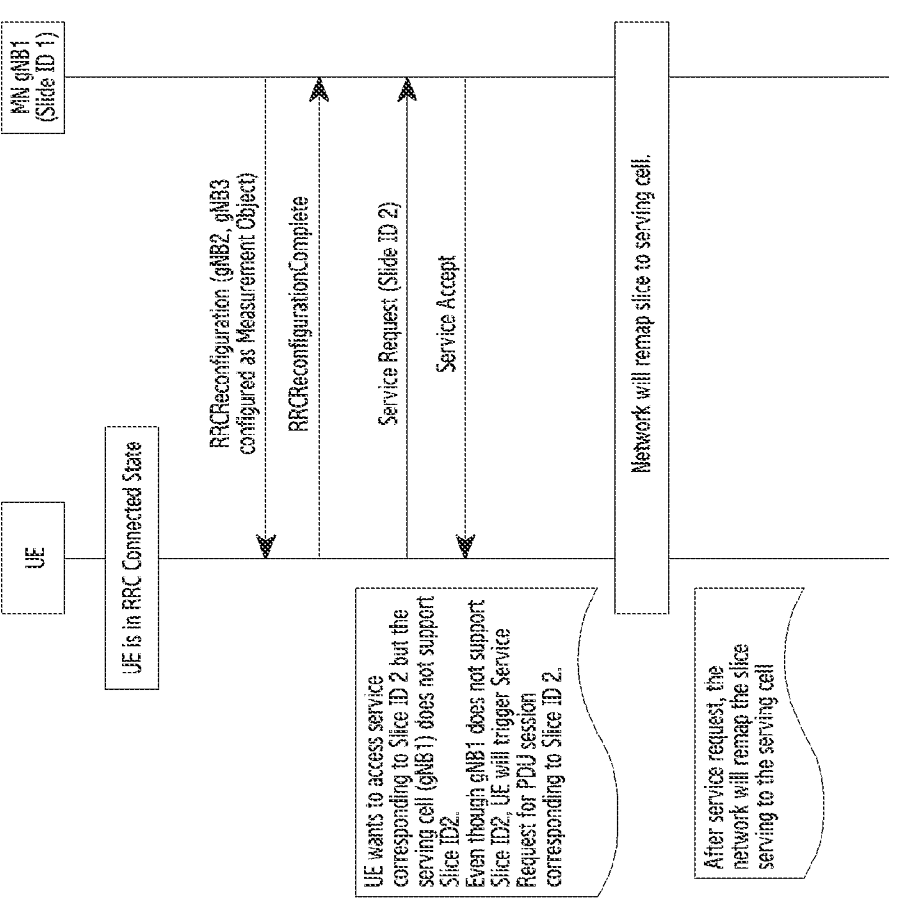

Scenario 5: No Consideration of RAN Slice During MR-DC Configuration:

FIG. 5 is a signal flow diagram illustrating an example fifth challenge scenario relating to non-consideration of RAN slice support during MR-DC configuration according to various embodiments. FIG. 5 illustrates scenario 5. Here, while the UE is in RRC connected state, the UE may wish to access a slice service that corresponds to a second slice (Slice ID 2) that is not supported by the UE's serving cell (gNB1 that supports Slice ID 2). In such a situation, the UE may then trigger a service request to the network for protocol data unit (PDU) session establishment for the second slice service. In response to this, the network may remap the slice supported by the serving cell, leading to a degradation in the quality of the service offered. This is undesirable as the purpose may be to avail different RAN slice services simultaneously using CA/DC from different cells.

Figure 11:
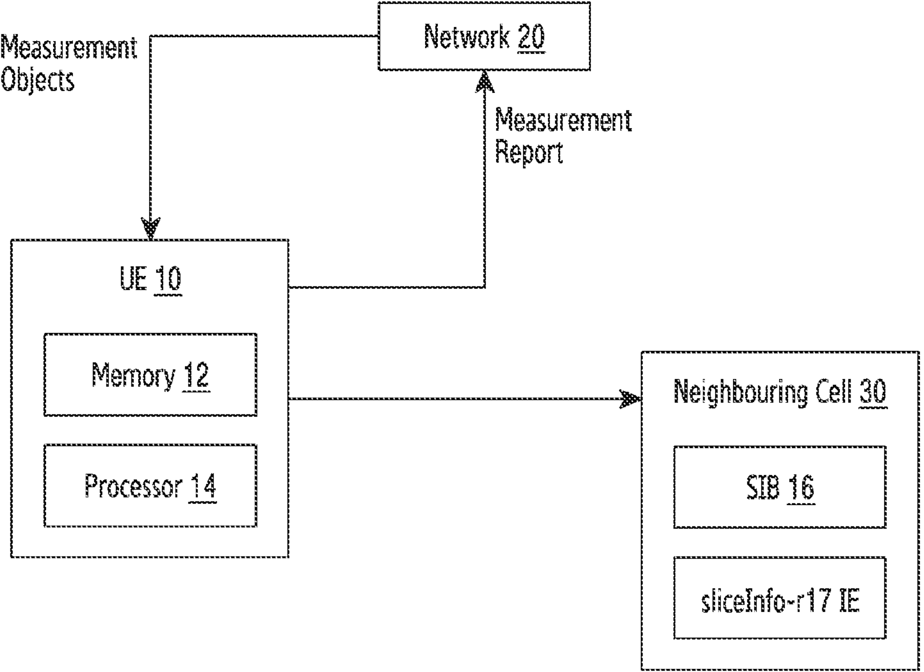
FIG. 11 is a block diagram illustrating an example configuration of a system for enabling consideration or prioritization of RAN slice support according to various embodiments.

Referring now to the drawings, where similar reference characters denote corresponding features consistently throughout the figures, there are various example embodiments. Various elements of the system illustrated in FIG. 11 are referenced in the various example embodiments.

Figure 6:
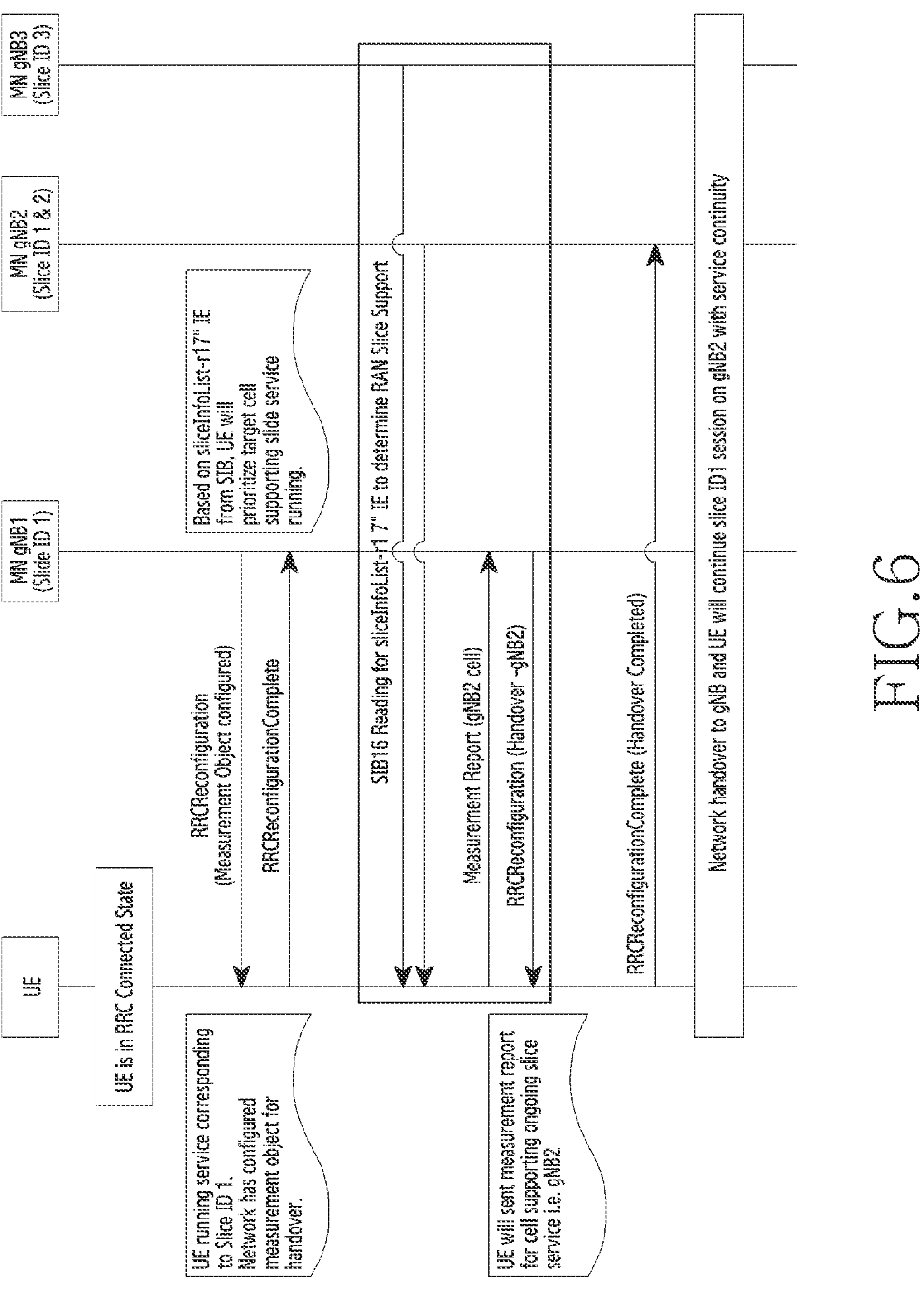
FIG. 6 is a signal flow diagram illustrating an example solution to the first challenge scenario relating to non-consideration of RAN slice support by a UE for handover according to various embodiments.

Scenario 1: No Consideration of RAN Slice Cell Service During Handover:

FIG. 6 is a signal flow diagram illustrating an example solution to the first challenge scenario relating to non-consideration of RAN slice support by a UE for handover according to various embodiments. FIG. 6 is a signal flow diagram illustrating an example solution to the scenario 1 according to various embodiments. While the UE 10 is in RRC CONNECTED state, the UE 10 may be running a slice service corresponding to its serving cell (gNB1 with Slice ID 1). Upon the network 20 configuring various NR frequencies as measurement objects, the UE 10 may detect the various neighboring cells 30 in the configured NR frequencies. As shown in FIG. 6, the UE 10 may be able to detect neighboring cells gNB2 (supporting Slice ID 1) and gNB3 (supporting Slice ID 3). The UE 10 may then read the sliceinfoList-17 information element (IE) of the SIB 16 for each of gNB2 and gNB3 to determine the NSAG ID or RAN slices supported by each of them. Through this, the UE 10 can determine that the gNB2 supports the UE's 10 intended RAN slice, and accordingly, the UE 10 may include in its measurement report, the details of gNB2. The measurement report may then be sent to the network 20, which may then handover the UE 10 to gNB2, thereby allowing continuation of the ongoing slice service (Slice ID 1) without any disruption (e.g., there is no discontinuity in the slice service).

Although the gNB2 may have a lesser signal strength than the gNB3, the UE 10 will prioritize gNB2 over gNB3, by including gNB2 in its measurement report, because gNB2 supports the UE's intended RAN slice.

Figure 7:
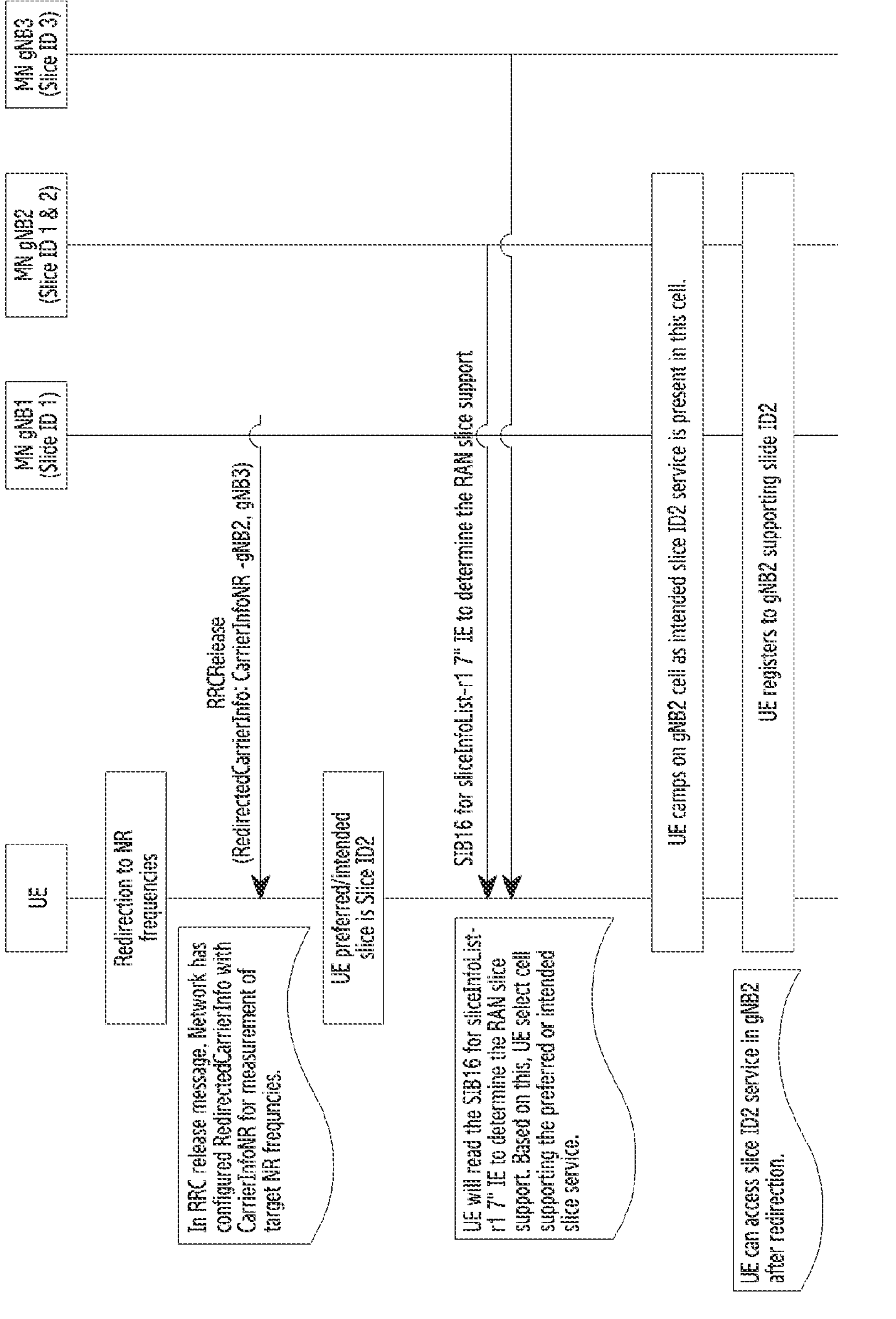
FIG. 7 is a signal flow diagram illustrating an example solution to the second challenge scenario relating to non-consideration of RAN slice support by a UE for redirection according to various embodiments.

Scenario 2: No Consideration of RAN Slicing/RAN Slice Support During Redirection:

FIG. 7 is a signal flow diagram illustrating an example solution to scenario 2 according to various embodiments. After RRC connection release, the UE 10 may be provided, by the network 20 in a RRC release message, with the redirected NR frequencies for camping. The UE 10 may detect a plurality of neighboring cells 30 belonging to the redirected NR frequencies. The UE 10 may read the sliceinfoList-17 IE of SIB 16 for each of the detected neighboring cells 30 to determine which of them support a desired/intended RAN slice (Slice ID 2 in FIG. 7). On discovering a neighboring cell (gNB2 in this case) that supports the UE's intended/desired RAN slice (Slice ID 2), the UE 10 may prioritize this cell (gNB2) and then camp on it. Although another detected cell (such as gNB1 or gNB3 in FIG. 7) in the NR frequencies may have a higher signal strength than the prioritized neighboring cell (also referred to herein as target cell), the UE may still select the prioritized neighboring cell (gNB2).

Figure 8:
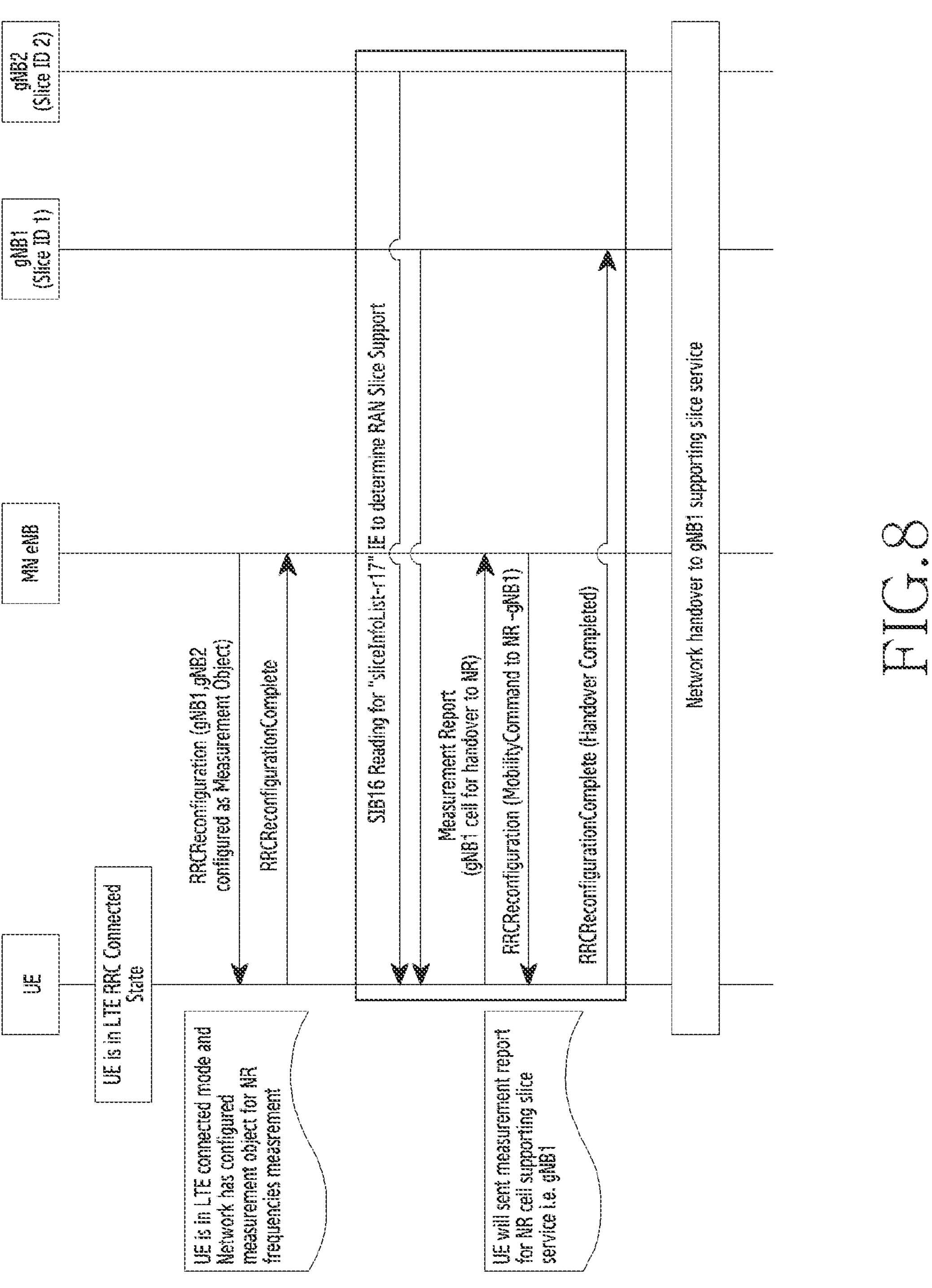
FIG. 8 is a signal flow diagram illustrating an example solution to the third challenge scenario relating to non-consideration of RAN slice support when a UE moves from a first RAT to 5G RAT according to various embodiments.

Scenario 3: No Consideration of RAN Slice Cell During Mobility Command to NR:

FIG. 8 is a signal flow diagram illustrating an example solution to scenario 3 according to various embodiments. The UE 10 may be in RRC connected state in long term evolution (LTE), and the network 20 may have configured the UE 10 with NR measurement object (NR frequencies) for inter-RAT handover. The UE 10 detects the neighboring cells 30 present in the configured NR frequencies, and reads the sliceinfoList-17 IE of SIB 16 to determine which RAN slices, if any, are supported by the detected neighboring cells 30. Through this, the UE 10 may be able to determine which neighboring cell(s) 30 in NR support the UE's intended RAN slice, prioritize this neighboring cell (the target NR cell), and include its details in a measurement report that is sent to the network 20. The network 20 may then handover the UE 10 to the target NR cell. Even though there may be other neighboring cells in the configured NR frequencies that offer a higher signal strength than the target cell, the UE 10 may not consider these neighboring cells in its measurement report if they do not support the UE's intended RAN slice.

Figure 9:
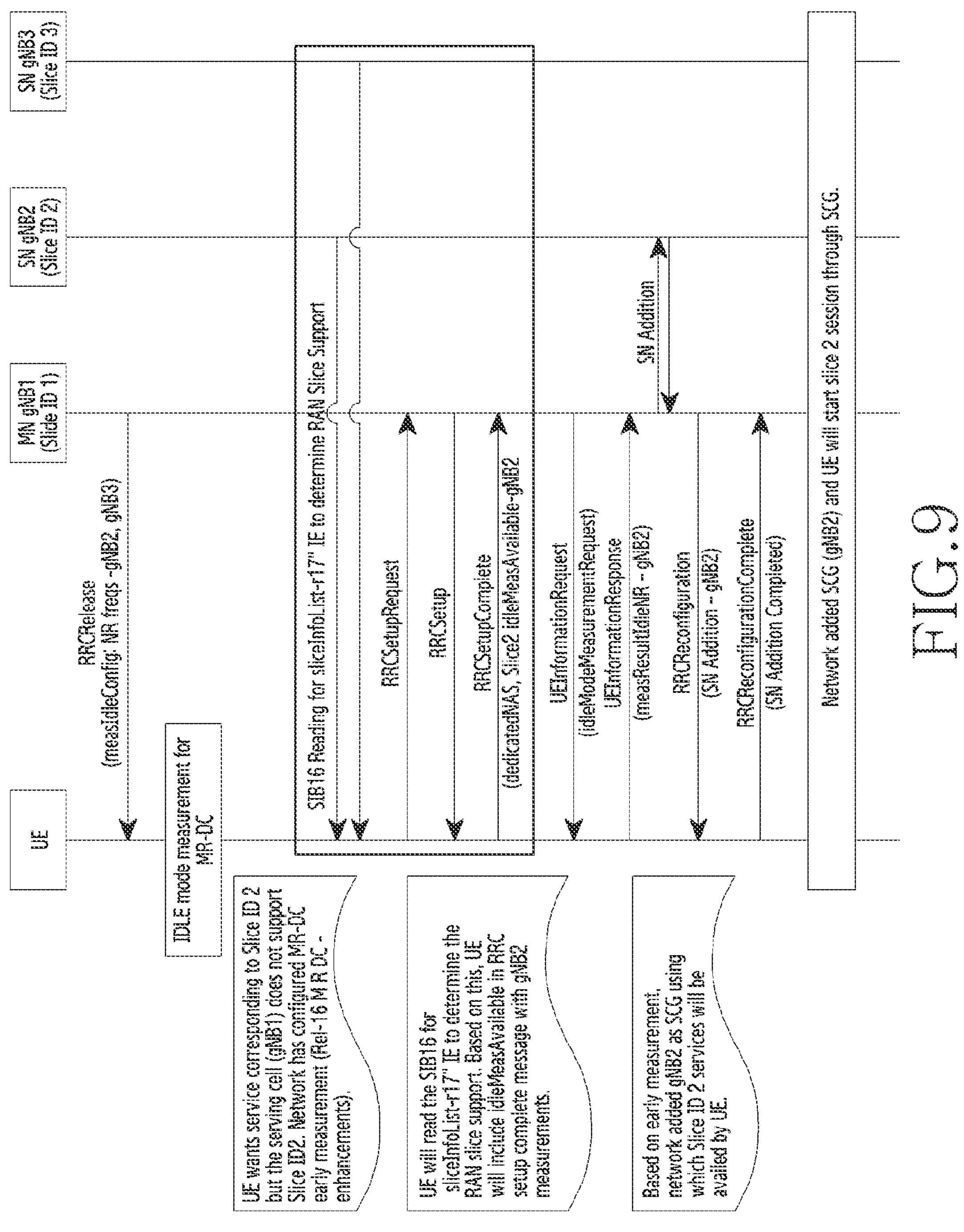
FIG. 9 is a signal flow diagram illustrating an example solution to the fourth challenge scenario relating to non-prioritization of RAN slice support during early rel-16 measurement according to various embodiments.

Scenario 4: No Prioritization of RAN Slice Cell Service During Release-16 Early Measurement:

FIG. 9 is a signal flow diagram illustrating an example solution to scenario 4 according to various embodiments. The serving cell (gNB 1 in FIG. 9) of the UE 10 may not support the UE's intended RAN slice (Slice ID 2 in FIG. 9). The network 20 may configure multi-radio dual connectivity (MR-DC) early measurement (Rel-16 MR-DC enhancements). The UE 10 may then read the sliceinfoList-17 IE of SIB 16 of the configured neighboring cells 30 to determine which of them support the UE's intended RAN slice. Referring to FIG. 9, gNB2 supports the UE's intended RAN slice (Slice ID 2). The UE 10 may then prioritize the idle mode measurement of the neighboring cell (target cell) 30 that supports the UE's intended RAN slice, and send the details of this neighboring cell, in a measurement report, to the network 20. Based on the measurement report, the network 20 may initiate secondary cell group (SCG) addition for the target cell (gNB2). The UE 10 may move to dual connectivity with the SCG addition of the target cell, and as a result, the UE 10 may be able to avail the services offered by the intended RAN slice. The end result may be that the UE 10 is able to avail the services offered by its serving cell and the target cell in dual connectivity. As shown in FIG. 9, even if gNB3 offered a higher signal strength than gNB2, the UE 10 may prioritize gNB2 over gNB3 because gNB2 supports the UE's intended RAN slice.

Figure 10:
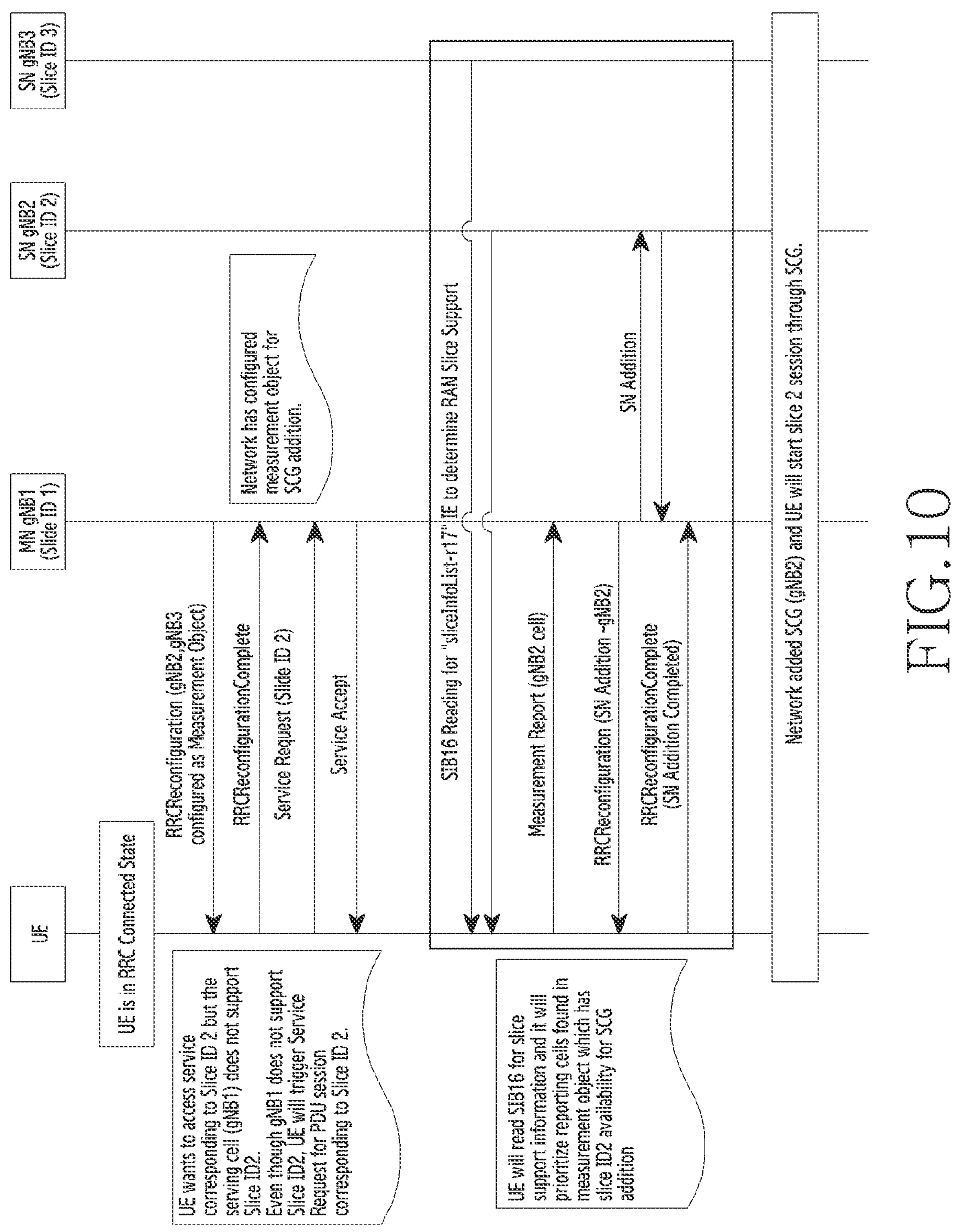
FIG. 10 is a signal flow diagram illustrating an example solution to the fifth challenge scenario relating to non-consideration of RAN slice support during MR-DC configuration according to various embodiments.

Scenario 5: No Consideration of RAN Slice During MR-DC Configuration:

FIG. 10 is a signal flow diagram illustrating an example solution to scenario 5 according to various embodiments. Referring to FIG. 10, the UE 10 may be in a NR RRC connected state, and a RAN slice specific application may be running in the UE 10 with the help of the UE's serving cell (gNB1 in FIG. 9). The network 20 may configure the UE 10 with NR measurement objects for handover or SCG addition for dual connectivity. When another application has requested for a second RAN slice service (service offered by Slice ID 2 in FIG. 9), that is not supported by the UE's serving cell, the UE 10 may send a service request to the network 20 for protocol data unit (PDU) session establishment for the second slice service. The UE 10 may then measure the NR measurement object frequencies for SCG addition. The UE 10 may read sliceinfoList-17 IE of SIB 16 of the neighboring cells 30 to determine which neighboring cell 30 is able to support the second slice service. The UE 10 may prioritize the neighboring cells 30 that support the second slice service, and include its details in a measurement report. Based on the measurement report, the network 20 may add the secondary cell (the neighboring cell that supports the second slice service). As a result, the UE 10 may move to dual connectivity with the SCG addition and also may avail the second slice service, thereby allowing the UE 10 to avail different RAN slice services simultaneously using carrier aggregation (CA)/DC from different cells.

FIG. 11 is a block diagram illustrating an example configuration of a system 100 for enabling consideration or prioritization of RAN slice support, according to various embodiments. Referring to FIG. 11, the system 100 comprises the UE 10, the network 20, and at least one neighboring cell 30.

The UE 10 may comprise a memory 12 and a processor (e.g., including processing circuitry) 14. The processor may be coupled to the memory, wherein the processor is configured to perform the various actions of the UE associated with the solutions to the challenge scenarios described above. The processor 14 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The memory may comprise, but is not limited to, volatile (e.g., random access memory (RAM)), non-volatile (e.g., read-only memory (ROM)), flash memory, or any combination. The processor represents one or more processors such as a microprocessor, a central processing unit or the like. The processor may also be a special-purpose processor such as an application specific integrated circuit (ASIC), a field programmable gate array (FPGA), a digital signal processor (DSP), a network processor, or the like.

The network 20 may configure the UE with the measurement objects, and the UE 10 may send measurement reports of the neighboring cell 30 to the network 20 for procedures like handover, SCG addition etc. The neighboring cell 30 may have the sliceinfoList-17 IE in its SIB 16 that is indicative of whether the neighboring cell 30 supports RAN slicing, and if so, which RAN slice it supports.

Embodiments disclosed herein relate to wireless communication networks, and for example, to prioritization of Radio Access Network (RAN) Slice Cells. When the user equipment (UE) undergoes cell selection, it takes into consideration if the neighboring cell supports a desired Radio Access Network (RAN) slice. The UE is able to determine if the neighboring cell supports the desired NSAG ID or RAN slice by reading the sliceinfoList-17 Information Element (IE) of the System Information Block (SIB) 16 of the neighboring cell.

A method for cell selection by a user equipment (UE) 10 is provided. According to an example embodiment, the method comprises: identifying, by the UE (e.g., UE 10), a plurality of neighboring cells (e.g., neighboring cell 30), determining, by the UE (e.g., UE 10), if at least one neighboring cell (e.g., neighboring cell) 30), among the plurality of neighboring cells (e.g., neighboring cell 30), supports a desired Network Slices AS Group (NSAG) identity (ID) or a Radio Access Network (RAN) slice and prioritizing, by the UE (e.g., UE 10), a neighboring cell (e.g., neighboring cell 30) that supports the desired NSAG ID or the RAN slice.

According to an example embodiment, the method may further comprise reading, by the UE (e.g., UE 10), a sliceinfoList-17 Information Element (IE) of a sixteenth system information block (SIB 16) of at least one neighboring cell (e.g., neighboring cell 30), wherein the sliceinfoList-17 IE indicates based on the at least one neighboring cell (e.g., neighboring cell 30) supporting the desired NSAG ID and sending, by the UE (e.g., UE 10), to a network (e.g., network 20) a measurement report, wherein the measurement report includes details of the prioritized neighboring cell (e.g., neighboring cell 30).

According to an example embodiment, the method may further comprise performing, by the network (e.g., network 20), at least one of the following on receiving the measurement report: causing a handover of the UE (e.g., UE 10) to the prioritized neighboring cell (e.g., neighboring cell 30) and initiating a secondary cell group (SCG) addition of a secondary cell, wherein the secondary cell is the prioritized neighboring cell (e.g., neighboring cell 30).

According to an example embodiment, the prioritized neighboring cell (e.g., neighboring cell 30) may include a target cell, and the method further comprises: receiving, by the UE (e.g., UE 10), one or more redirection frequencies from a network. wherein the plurality of neighboring cells (e.g., neighboring cell 30) belong to the one or more redirection frequencies, and the UE (e.g., UE 10) camps on the target cell on selecting the target cell.

According to an example embodiment, the prioritized neighboring cell (e.g., neighboring cell 30) may include a target cell, and the method further comprises: configuring, by a network (e.g., network 20), the UE (e.g., UE 10) with a plurality of frequencies within a second Radio Access Technology (RAT). wherein the plurality of neighboring cells (e.g., neighboring cell 30) belong to the plurality of frequencies; a source cell of the UE (e.g., UE 10) belongs to a first RAT; the target cell belongs to the second RAT, and the UE (e.g., UE 10) is transferred to the target cell on selecting the target cell.

According to an example embodiment, the prioritized neighboring cell (e.g., neighboring cell 30) may include a secondary cell, and the method further comprises: initiating, by a network (e.g., network 20), a SCG addition of the secondary cell, wherein the UE (e.g., UE 10) enters dual connectivity mode on the SCG addition by the network.

According to an example embodiment, the method further comprises sending, by the UE (e.g., UE 10), to the network (e.g., network 20) a service request for protocol data unit (PDU) establishment for a service from the desired NSAG ID, wherein a source cell of the UE (e.g., UE 10) does not support the desired NSAG ID.

A user equipment (UE) comprising: a memory, wherein the memory stores a plurality of instructions and at least one processor, comprising processing circuitry, coupled to the memory, wherein at least one processor, individually and/or collectively, is configured to execute the plurality of instructions to cause the UE to: identify a plurality of neighboring cells (e.g., neighboring cell 30), determine whether at least one neighboring cell (e.g., neighboring cell 30), among the plurality of neighboring cells (e.g., neighboring cell 30), supports a desired Network Slices AS Group (NSAG) identity (ID) and prioritize a neighboring cell (e.g., neighboring cell 30) that supports the desired NSAG ID.

According to an example embodiment, at least one processor, individually and/or collectively is configured to cause the UE to: read a sliceinfoList-17 IE of a SIB 16 of at least one neighboring cell (e.g., neighboring cell 30), wherein the sliceinfoList-17 IE indicates based on the at least one neighboring cell (e.g., neighboring cell 30) supporting the desired NSAG ID and send to a network (e.g., network 20) a measurement report, wherein the measurement report includes details of the prioritized neighboring cell (e.g., neighboring cell 30).

According to an example embodiment, the prioritized neighboring cell (e.g., neighboring cell 30) may include a target cell, and wherein at least one processor, individually and/or collectively is configured to cause the UE to: receive one or more redirection frequencies from a network, wherein the plurality of neighboring cells (e.g., neighboring cell 30) belong to the one or more redirection frequencies, and the UE (e.g., UE 10) camps on the target cell on selecting it.

According to an example embodiment, the prioritized neighboring cell (e.g., neighboring cell 30) may include a target cell, and wherein at least one processor, individually and/or collectively, is configured to cause the UE to: allow the UE (e.g., UE 10) to be configured, by a network (e.g., network 20), with a plurality of frequencies within a second RAT, wherein the plurality of neighboring cells (e.g., neighboring cell 30) belong to the plurality of frequencies, a source cell of the UE (e.g., UE 10) belongs to a first RAT, and the target cell belongs to the second RAT, and the UE (e.g., UE 10) is transferred to the target cell on selecting the target cell.

According to an example embodiment, at least one processor, individually and/or collectively, is configured to cause the UE to: allow the UE (e.g., UE 10) to enter dual connectivity mode on a SCG addition of a secondary cell by a network (e.g., network 20), wherein the secondary cell is the prioritized neighboring cell (e.g., neighboring cell 30).

According to an example embodiment, at least one processor, individually and/or collectively, is configured to cause the UE to: send to the network (e.g., network 20) a service request for PDU establishment for a service from the desired NSAG ID, wherein a source cell of the UE (e.g., UE 10) does not support the desired NSAG ID.

According to an example embodiment, at least one processor, individually and/or collectively, is configured to: allow the UE (e.g., UE 10) to undergo a handover to the prioritized neighboring cell (e.g., neighboring cell 30).

A method performed by a user equipment (UE) in a wireless communication system is provided. The method comprises receiving, from a base station, a system information block (SIB) including slice information, identifying at least one cell for a slice service for the UE among a plurality of neighboring cells based on the slice information and camping on the at least one cell for the slice service.

The slice information includes information on a slice list indicating the at least one cell supporting a network slices access stratum (AS) group (NSAG) identity (ID) corresponding to the slice service.

The method further comprises transmitting, to a network via the base station, a measurement report including information on the at least one cell identified based on the information on the slice list.

The method further comprises receiving, from the base station, a message for a handover of the UE to the at least one cell, wherein, in case that the at least one cell corresponds to a secondary cell group (SCG), the at least one cell is added to a SCG list.

The method further comprises receiving, from a network via the base station, information on one or more redirection frequencies, wherein the plurality of neighboring cells belong to the one or more redirection frequencies.

The method further comprises receiving, from a network via the base station, information on a plurality of frequencies within a first radio access technology (RAT), wherein the plurality of neighboring cells belong to the plurality of frequencies.

A source cell of the UE belongs to a second RAT, wherein the at least one cell corresponding to a target cell belongs to the first RAT, and wherein a source cell does not support a network slices access stratum (AS) group (NSAG) identity (ID).

In case that the at least one cell is a secondary cell, a SCG addition of the secondary cell is performed, and wherein the UE enters dual connectivity (DC) mode based on the SCG addition.

The method further comprises transmitting, to a network via the base station, a service request for protocol data unit (PDU) session establishment for the slice service.

The method further comprises identifying the at least one cell supporting a radio access network (RAN) slice among the plurality of neighboring cells and camping on the at least one cell for the slice service.

A user equipment (UE) in a wireless communication system is provided. The UE comprises at least one processor and memory storing instructions that, when executed by the at least one processor, cause the UE to receive, from a base station, a system information block (SIB) including slice information, identify at least one cell for a slice service for the UE among a plurality of neighboring cells based on the slice information, and camp on the at least one cell for the slice service.

The slice information includes information on a slice list indicating the at least one cell supporting a network slices access stratum (AS) group (NSAG) identity (ID) corresponding to the slice service.

The instructions, when executed by the at least one processor, further cause to the UE to transmit, to a network via the base station, a measurement report including information on the at least one cell identified based on the information on the slice list.

The instructions, when executed by the at least one processor, further cause to the UE to receive, from the base station, a message for a handover of the UE to the at least one cell, and wherein, in case that the at least one cell corresponds to a secondary cell group (SCG), the at least one cell is added to a SCG list.

The instructions, when executed by the at least one processor, further cause to the UE to receive, from a network via the base station, information on one or more redirection frequencies, and wherein the plurality of neighboring cells belong to the one or more redirection frequencies.

The instructions, when executed by the at least one processor, further cause to the UE to receive, from a network via the base station, information on a plurality of frequencies within a first radio access technology (RAT), and wherein the plurality of neighboring cells belong to the plurality of frequencies.

A source cell of the UE belongs to a second RAT, wherein the at least one cell corresponding to a target cell belongs to the first RAT, and wherein a source cell does not support a network slices access stratum (AS) group (NSAG) identity (ID).

In case that the at least one cell is a secondary cell, a SCG addition of the secondary cell is performed, and wherein the UE enters dual connectivity (DC) mode based on the SCG addition.

The instructions, when executed by the at least one processor, further cause to the UE to transmit, to a network via the base station, a service request for protocol data unit (PDU) session establishment for the slice service.

The instructions, when executed by the at least one processor, further cause to the UE to identify the at least one cell supporting a radio access network (RAN) slice among the plurality of neighboring cells and camp on the at least one cell for the slice service.

The various example embodiments disclosed herein can be implemented through at least one software program running on at least one hardware device and performing network management functions to control the network elements. The network elements shown in FIG. 11 include blocks which can be at least one of a hardware device, or a combination of hardware device and software module.

While the disclosure has been illustrated and described with reference to various example embodiments, it will be understood that the various example embodiments are intended to be illustrative, not limiting. It will be further understood by those skilled in the art the various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a user equipment (UE) in a wireless communication system, the method comprising:
- receiving, from a first base station, a radio resource control (RRC) reconfiguration message including information on measurement objects, while the UE camps on a first cell of the first base station via a first network slice for a first application running in the UE;
- identifying that a second application is triggered to start in the UE, and a second network slice for the second application is not supported by the first cell;
- transmitting, to the first base station, a service request message for a session establishment of the second network slice, based on identifying that the second application is triggered to start and the second network slice is not supported by the first cell;
- in response to a service accept message being received as a response to the service request message, receiving, from a plurality of base stations, system information blocks (SIBs);
- identifying, among the SIBs, a SIB including a network slice identity (ID) corresponding to the second network slice for the second application;
- identifying that the SIB is received on a second cell of a second base station among the plurality of base stations;
- performing a measurement on a measurement object corresponding to the second cell, among the measurement objects;
- transmitting, on the second cell, a measurement result of the measurement;
- receiving, on the second cell, an RRC reconfiguration message for indicating an addition of the second cell is completed; and
- receiving, on the second cell, data of the second application via the second network slice while the UE receives, on the first cell, data of the first application via the first network slice.

2. The method of claim 1, wherein the network slice ID included in the SIB received on the second cell indicates that the second cell supports the second network slice, and
- wherein the network slice ID is a network slice access stratum (AS) group (NSAG) ID.

3. The method of claim 1, wherein, in a case that the second cell corresponds to a secondary cell group (SCG), the second cell is added to a SCG list.

4. The method of claim 1, further comprising: receiving, from the first base station, information on a plurality of frequencies within a first radio access technology (RAT).

5. The method of claim 4, wherein the first cell is associated with the first RAT, and wherein the second cell is associated with a second RAT.

6. The method of claim 1, wherein, in a case that the second cell corresponds to a secondary cell group (SCG), the second cell is added to a SCG list, and
- wherein the UE enters dual connectivity (DC) mode based on the second cell being added to the SCG list.

7. A user equipment (UE) in a wireless communication system, the UE comprising:
- at least one processor comprising processing circuitry; and
- memory storing instructions that, when executed individually and/or collectively by the at least one processor, cause the UE to:
- receive, from a first base station, a radio resource control (RRC) reconfiguration message including information on measurement objects, while the UE camps on a first cell of the first base station via a first network slice for a first application running in the UE, identify that a second application is triggered to start in the UE, and a second network slice for the second application is not supported by the first cell, transmit, to the first base station, a service request message for a session establishment of the second network slice, based on identifying that the second application is triggered to start and the second network slice is not supported by the first cell, in response to a service accept message being received as a response to the service request message, receive, from a plurality of base stations, system information blocks (SIBs), identify, among the SIBs, a SIB including a network slice identity (ID) corresponding to the second network slice for the second application;

identify that the SIB is received on a second cell of a second base station among the plurality of base stations, perform a measurement on a measurement object corresponding to the second cell, among the measurement objects;

transmit, on the second cell, a measurement result of the measurement;

receive, on the second cell, an RRC reconfiguration message for indicating an addition of the second cell is completed, and receive, on the second cell, data of the second application via the second network slice while the UE receives, on the first cell, data of the first application via the first network slice.

8. The UE of claim 7, wherein the network slice ID included in the SIB received on the second cell indicates that the second cell supports the second network slice, and wherein the network slice ID is a network slice access stratum (AS) group (NSAG) ID.

9. The UE of claim 7, wherein, in a case that the second cell corresponds to a secondary cell group (SCG), the second cell is added to a SCG list.

10. The UE of claim 7, wherein the instructions, when executed by the at least one processor, further cause to the UE to:

receive, from the first base station, information on a plurality of frequencies within a first radio access technology (RAT).

11. The UE of claim 10, wherein the first cell is associated with the first RAT, and wherein the second cell is associated with a second RAT.

12. The UE of claim 7, wherein, in a case that the second cell corresponds to a secondary cell group (SCG), the second cell is added to a SCG list, and wherein the UE enters dual connectivity (DC) mode based on the second cell being added to the SCG list.

* * * * *